May 19, 1964
S. S. HELD
3,134,062
LIGHT MAGNETIC CIRCUIT OSCILLATING MOTOR
Filed Oct. 19, 1960
3 Sheets-Sheet 2
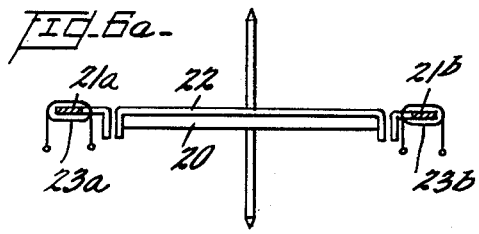
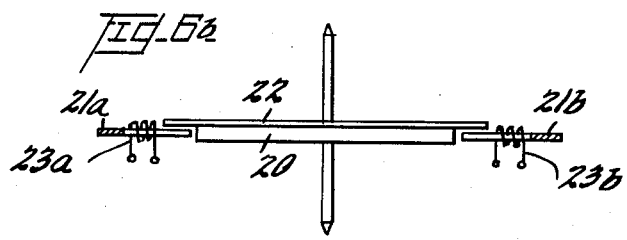
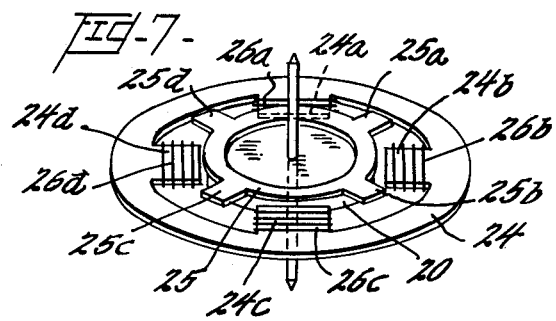
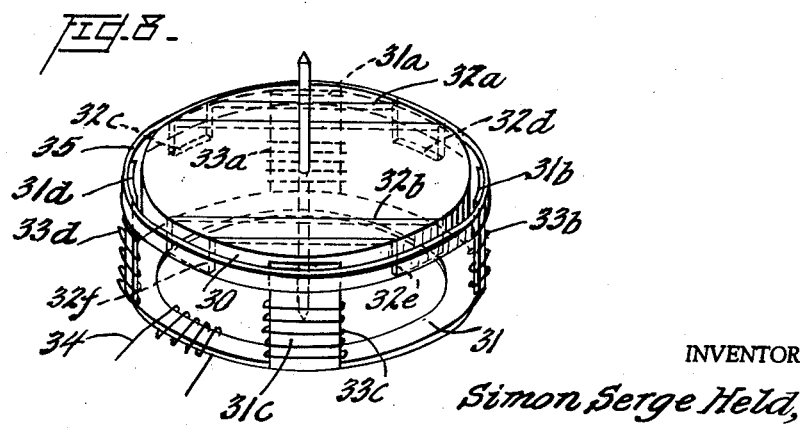
INVENTOR
Simon Serge Held,
BY Watson, Cole, Grindle & Watson
ATTORNEYS

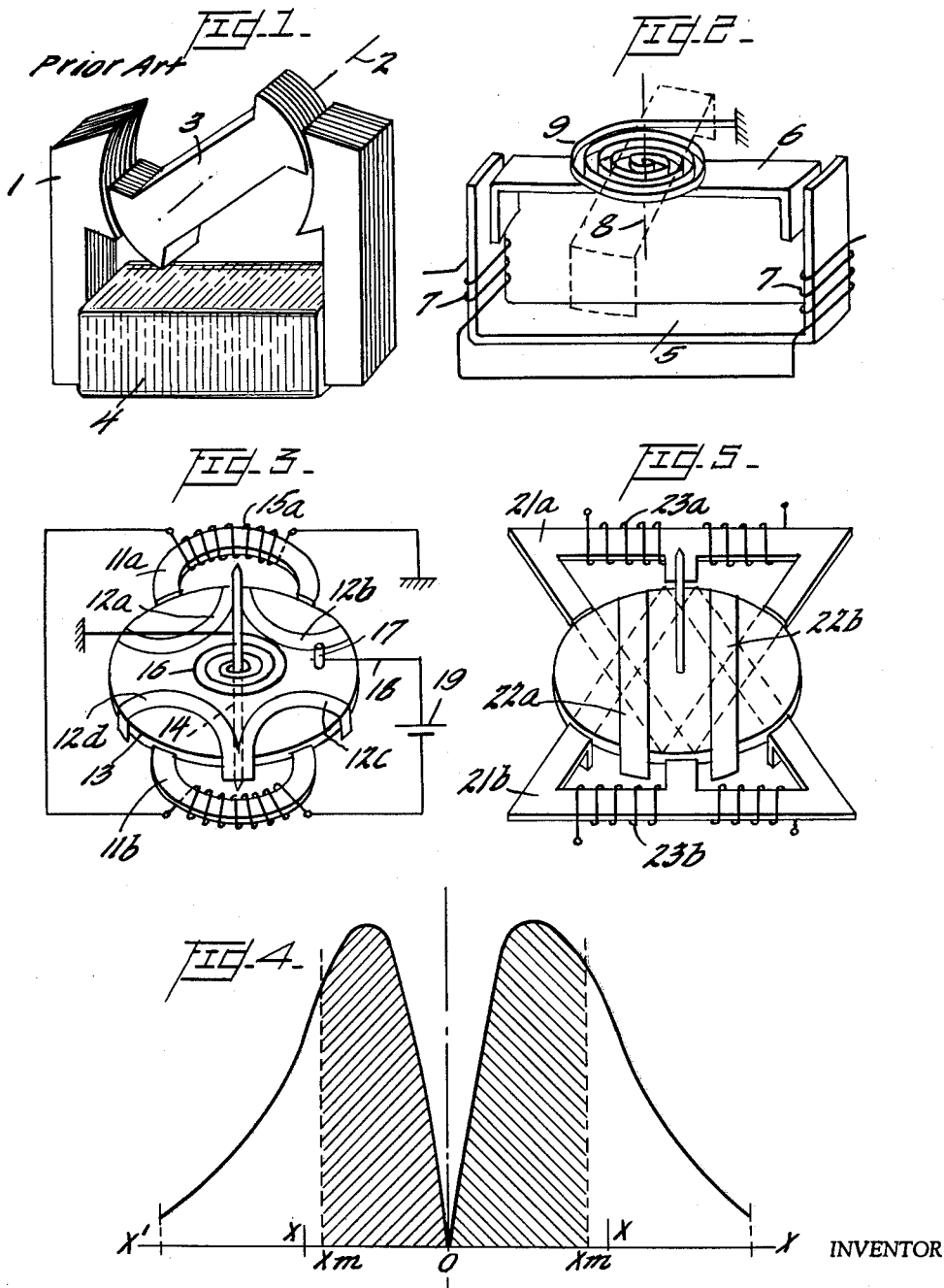

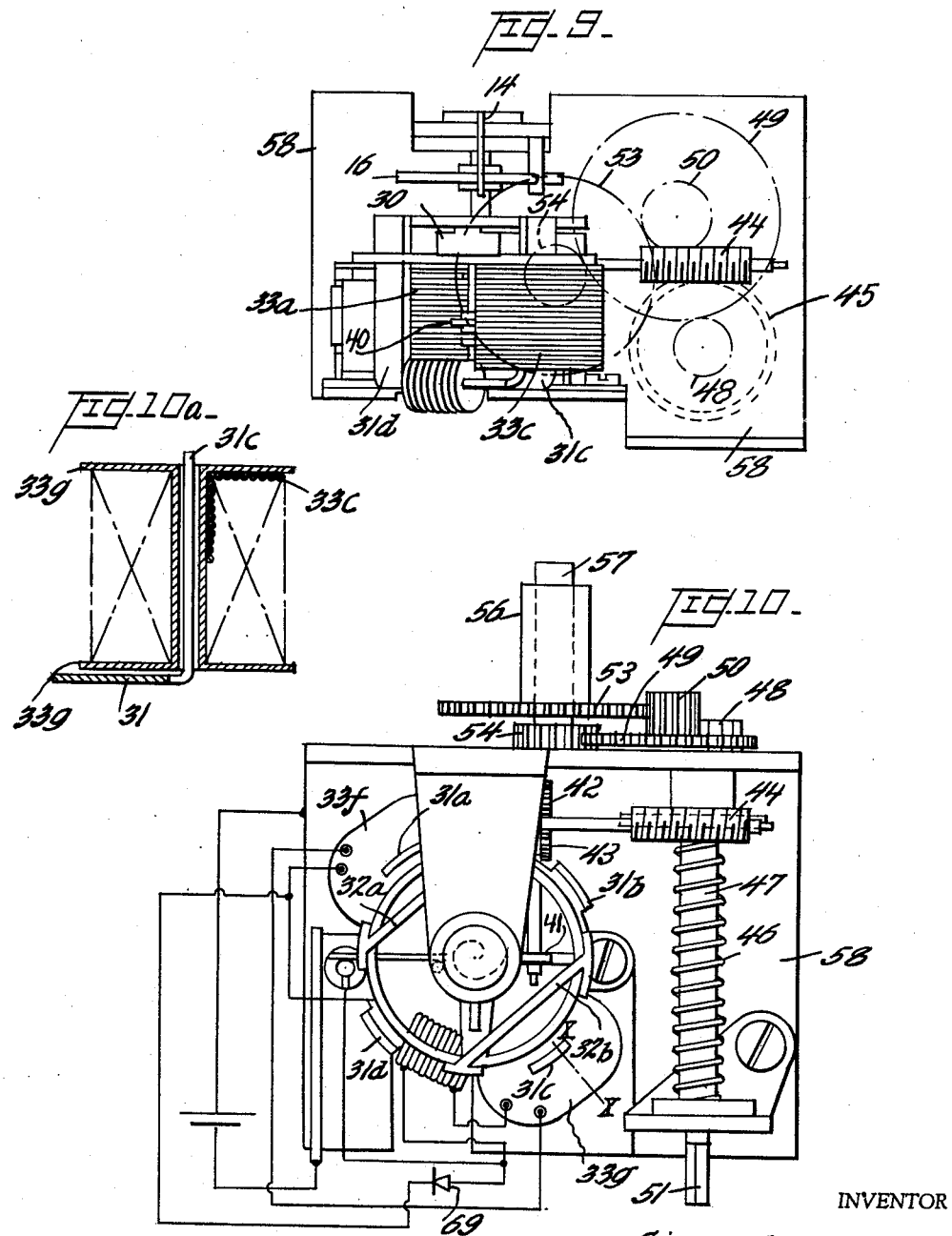

United States Patent Office 3,134,062
Patented May 19, 1964

3,134,062
LIGHT MAGNETIC CIRCUIT OSCILLATING MOTOR
Simon Serge Held, 31 Rue de Chazelles, Paris, France
Filed Oct. 19, 1960, Ser. No. 63,654
Claims priority, application France Oct. 24, 1959
13 Claims. (Cl. 318—128)

This invention relates to a light magnetic circuit oscillating motor of the type used in connection with timekeeper movements, such as watches, clocks, timers and similar apparatus. Electrical timekeeper movements of this type generally comprise a balance wheel driven by a spiral torsion spring, and electric motor means comprising a rotatable core or armature of magnetic material secured to the balance wheel and a stationary electromagnetic intermittently energized in synchronism with the oscillating motion of the armature and intermittently imparting an electromagnetic torque thereto for sustaining the swinging motion.

It is an object of this invention to provide electric motor means for the purpose just specified, of an improved construction such that the regular synchronism in the operation thereof will not be substantially disturbed by the application of periodic sustaining pulses in the form of a torque acting over an appreciable angular extent, named "driving elongation," of the oscillating movement of the balance wheel.

Another object is to provide such an electric motor which can be successfully powered from a low-voltage source of D.-C. energy and consequently to reduce the power requirements while improving the efficiency of such motor.

A further object is to construct an electric motor of the kind indicated in which the intermittent application of pulses will be achieved by means of a simple pair of electric contacts while eliminating the occurrence of cut-off sparks, or at any rate greatly reducing the energy content of any sparks that may occur at the cut-off point in each swinging cycle.

It is also an object to provide such an electromotor which will be sturdy and compact and one which is susceptible of simple and low-cost manufacture in large-scale series production, and a related object is to provide such a motor including a small number of simple parts all producible from thin-gauge metal sheet by simple punching and bending operations, and preformed electric windings adapted to be simply threaded over the stampings.

An additional object of the invention is to provide such an electric motor wherein substantial space is made available around the oscillating pivot of the balance wheel for accommodating in addition to the balance wheel and its hair-spring, at least part of the actual clockwork mechanism, and which space will be readily accessible both from above and below for the convenient insertion and subsequent adjustment and maintenance of the components in said space.

The above and further objects of the invention and the features whereby such objects are accomplished, will be made clear from the ensuing detailed description of a few exemplary forms of the invention given by way of illustration but not of limitation. In the drawings:

FIG. 1 is a simplified perspective view of a conventional reciprocatory electric motor of the general class to which the invention relates, illustrated for comparison with the improved motor of the invention.

FIG. 2 is a simplified perspective view of a schematic bipolar magnetic circuit for a motor, illustrating the basic principle of the invention.

FIG. 3 is a schematic perspective view of one form of construction of the invention.

FIG. 4 is a graph showing the variations of motor torque applied to the balance wheel in each swing of its reciprocatory cycle.

FIGS. 5 and 7 are views similar to FIG. 3 illustrating two modified forms of the invention.

FIG. 6a is a side view of the structure shown in FIG. 5.
FIG. 6b is a similar view of a preferred modification.
FIG. 8 shows a preferred form of the invention;
FIGS. 9 and 10 are a side and a plan view, respectively, illustrating a practical embodiment of an improved motor of the type diagrammatically shown in FIG. 8, and including clockwork movement driven thereby and FIG. 10a shows a winding as taken along section lines X—X of FIG. 10.

Reference is first made to FIG. 1 which illustrates the general lay-out of a conventional reciprocatory electric motor for timekeeping applications including a U-shaped stationary magnetic core structure 1 having a solenoid winding 4 on the cross-arm of the U, and a rotatable magnetic armature 3 pivoted about an axis 2 between the flared pole-pieces formed at the ends of the U-shaped core. It will be noted that in such conventional arrangement substantially all of the magnetic material of the stationary yoke 1 is positioned to one side from the axis 2 of the swinging core 3. It will also be noted that the magnetic circuit elements are of generally square or rectangular cross sectional shape and comprise stacks of stampings so that they have a substantial volume and mass of iron or other magnetic metal. In addition to these deficiencies of the conventional magnetic circuit, it is seen that the construction requires the provision of flared polar shoes and needs to be dismantled in order to make it possible to insert a solenoid 4 on the yoke. This is a difficulty in connection with mass production.

As will be presently shown the above defects are completely eliminated from the improved motor construction of the invention. In the first place, the magnetic material of the yoke is symmetrically distributed to either side from the oscillating axis of the balance wheel. Furthermore, the magnetic circuit used is in the form of a single thickness of thin-gage metal strip or sheet (of the order of a few tenths of one millimeter) rather than a stack of stampings and the polar shoes of the magnetic circuit are obtained by simply punching and, contingently, bending, such single strip or sheet.

The invention simultaneously achieves a high rate of variation in the magnetic flux during each swing of the armature, with a correspondingly large amount of work developed during the drive phase of the cycle, coupled with a relatively low inductance and consequently small amount of stored electromagnetic energy (under electromagnetic form $\frac{1}{2}Li^2$), so that cut-off sparking effects are reduced. These results are a further direct consequence of the provision of the magnetic circuit of the invention in the form of a single thin-gauge metal sheet, involving a small volume of magnetic material.

The basic advantage of using, in accordance with the invention, a thin-gage sheet or strip-type magnetic circuit, to which all of the above advantages are ascribable, is itself made possible by the specific geometric layout of the electric motor of the invention, wherein the pole pieces of the core and armature are formed as flanges so disposed that the magnetic flux lines in the airgaps defined by said flanges in the minimum-reluctance position of the oscillating armature, are directed substantially normally to the direction of the flux lines in the core material, i.e. to the general plane of the strip or sheet material.

This underlying geometry will be made clear from FIG. 2 which illustrates the basic layout of the improved motor. The structure shown comprises a stationary yoke or core member 5 in the form of a single strip of magnetic sheet material bent to U-shape, and a swinging armature member 6 made from similar thin-gage material, and of generally similar shape though with shorter flanges, disposed as shown so as to be rotatable about a vertical axis 8 perpendicular to the base or cross arm of the U shaped core. In each of the two U-members 5 and 6, the end flanges or arms of the U serve as the pole pieces, with the flanges of the oscillating armature 6 being here shown positioned radially inwards of the flanges of the stationary core 5. Wound around the flanges of the core 5 are respective energizing windings 7. A spiral hairspring 9 is associated with the armature 6 so as to tend to rotate it to a neutral or maximum-reluctance position in which the armature is normal to the cross member of yoke 5, i.e. the dotted-line position in FIG. 2. It will be noted that the active surface areas of the pole pieces are of broad area and are subjected to strong tangential or laterally-directed attractive forces.

Experience has shown that according to the invention, iron and similar magnetic materials even when reduced to a single thin strip of say about 0.4 to 0.5 mm. thickness, is an excellent conductor of magnetic flux nor does it lead to excessive leakage. However, it is well known that an electric winding comprising a large number of conductor layers wound around a magnetic core will generate considerable leakage flux in proportion with the depth of the winding used; and this objectionable effect is present to an even increased degree when the magnetic core used is a thin strip as is the case in the invention. This is because the leakage factor is approximately proportional to the ratio of the cross sectional area of the coil winding over the average sectional area of the magnetic material. In an arrangement similar to that shown in FIG. 2 should the windings be considerably thicker than the core, high leakage would result. This difficulty is overcome according to the invention by providing a relatively high number of pole pieces on the core, e.g. four (rather than the two shown in FIG. 2) and distributing the energizing winding in the form of a corresponding high number of winding sections around the respective pole members, positioned closely adjacent the core surface. The winding sections may be interconnected in any suitable circuit configuration, such as series or parallel. Thus, in the preferred forms of the invention, the core structure of the improved motor will be provided with at least four poles, while the armature member may if desired be provided with a greater number of tips.

One such arrangement is schematically shown in FIG. 3. In this construction, the stationary core or yoke structure is provided in the form of a pair of core members 11a and 11b each in the form of a semi-circular ring section and both disposed opposite each other in a common plane with their concave sides directed inwards. Between the two core members 11a, 11b and in their common general plane a disk-shaped balance wheel 13 is mounted for rotation about a vertical axis. The oscillating armature structure in this construction is provided in the form of four part-circular ring sections 12a to 12d, secured as shown to the upper surface of balance wheel 13 in two diametrically opposite pairs with their convex sides directed inwards. All the six ring sections 11 and 12 of both the stationary and the movable portions of the magnetic circuit are formed from the same thin-gage magnetic stock as previously described. The movable core sections 12 rather than being as shown secured to the upper face of the disk 13 may if desired be imbedded in the depth of the disk. All the six core sections are preferably produced by stamping the magnetic strip stock to common standard shape and dimensions for obvious reasons of economy. The ends of the part ring sections 11 and 12 are bent or flanged, as shown, so as to present relatively large surface areas to one another when the rotatable structure assumes one of its minimum-reluctance positions relatively to the stationary core structure. Wound on each of the stationary ring core sections 11a and 11b is an energizing winding 15a and 15b, preferably uniformly distributed throughout the length of the ring member, and both windings may be connected in a series circuit as shown with a D.-C. source 19. A hairspring 16 is associated with the rotatable structure so as to apply thereto a torque tending to rotate said structure to the maximum-reluctance position at which each polar flange of each of the stationary core members 15a and 15b is midway between the polar flanges of a related one of the rotatable core members 12, this being the position shown in FIG. 3.

Means are provided for periodically applying an energizing pulse to each of the windings 15a and 15b for sustaining the oscillating motion of the rotatable structure. Such means as here shown comprise a contact pin 17 upstanding from the disc 13 and arranged to engage a flexible contact strip 18 during a substantial portion of the angular half-oscillation of the disc 13, to either side from the maximum reluctance (or neutral) position of the disk.

It is during the period in each cycle throughout which the contact between pin 17 and spring-strip 18 is made, that a drive impulse is applied to the rotatable structure. In theory, the extent of this drive period may be made equal to the full angular extent, or driving elongation of the half-oscillation required to bring the disk from its maximum-reluctance or neutral position (unstable equilibrium position) to either of its two symmetrical minimum-reluctance end positions (of stable equilibrium). In practice however, it is found that smoother and more reliable operation is obtained if the said drive period is made to have an angular extent somewhat less, e.g. 5° less, than that of the half-oscillation.

The balance wheel or disk on termination of each drive period, overoscillates due to inertia and continues to rotate until all of its kinetic energy has been absorbed by the hairspring. At that time its velocity reduces to zero and rotation is reversed. It then returns freely to its neutral position of unstable equilibrium and moves past this position due to inertia and then experiences a new drive period in the opposite direction from the previous one, to complete its oscillating cycle; this is then repeated indefinitely.

This type of operation is clearly illustrated in the graph of FIG. 4, in which the abscissae indicate angular displacements to either side of the reference point O which corresponds to the neutral position of maximum reluctance; the ordinates represent the values of drive torque applied to the oscillating structure. Considering the operation of the system from the instant that the disk is oscillating past its neutral positon in one, say the rightward or positive direction, it is seen that the disk is subjected to a rising torque which increases rapidly from zero value due to the combined actions of the electromagnetic and spring forces. The hatched portion of the curve represents the period during which the electromagnetic couple is active, i.e. the drive period of the cycle, and in this example it has been assumed that the angular extent $OX_m$ of this drive period is about 40°, slightly less than the angular extent OX, corresponding to 45°, from the neutral maximum-reluctance position O to the position of minimum reluctance indicated at X. The work developed during the positive oscillation is thus measured by the cross-hatched area under the curve, and the total work in each two-way oscillating cycle is the sum of the cross hatched areas under the two symmetrical branches of the curve.

The semi-annular configuration imparted to the stationary and moving core members 11 and 12 in FIG. 2 has a disadvantage in that winding of the coil sections 15a and 15b is made somewhat difficult. This difficulty may be overcome and other advantages achieved by using the modified construction shown in FIG. 5. Here the stationary core structure comprises two oppositely arranged core members 21a and 21b each in the form of a stamping of E configuration with converging end arms, as shown. The oscillating armature structure comprises a pair of straight, parallel strips 22a and 22b symmetrically secured across the face of the balance wheel 20. The ends of the branches of each E core member and the ends of the armature strips may all be flanged, as shown, to provide cooperating polar surfaces. The relative dimensioning is such that in each of the minimum-reluctance positions of the system, as indicated by the dotted lines in FIG. 5, the polar flanges at corresponding ends of the two spaced armature strips 22a and 22b register with the polar flanges of two adjacent arms of a related E core member, and the armature strips thus provide magnetic connection between adjacent pole members of one core member and the diametrically-opposite, adjacent pole members of the other core member. The strips 22a and 22b thus are traversed by magnetic flux in opposite directions and form a closed magnetic circuit between the core members, when the windings 23a and 23b wound on the respective core members are energized. In this construction therefore the opposite core members are not independent of each other magnetically. This arrangement has one disadvantage with respect to FIG. 3, in that the magnetic circuit in each minimum-reluctance position includes four airgaps in series, instead of only two as in FIG. 3.

In both the modifications of FIGS. 3 and 5, the fact that the polar surfaces on the core members are formed by flanged portions of the members practically precludes the use of separately preformed windings adapted to be slipped or threaded over the core members. To make possible this desirable type of construction, the further modification illustrated by FIG. 6b may be used. The general layout of the system as seen in plan may be similar to that described with reference to FIG. 5. Here however the ends of the armature strips 22a and 22b as well as the ends of the branches of each E-shaped core members 21a and 21b are not bent, but protrude so as to provide flat polar extensions or flanges. The core members 22a, 22b are positioned in a common plane somewhat displaced below the plane of the armature strips 21a and 21b, so as to provide the overlapping relationship between the polar surfaces that is clearly indicated in FIG. 6b for the minimum-reluctance position of the system. In other words, in this modification the width dimension of the airgaps is parallel to the oscillating axis of the balance wheel rather than normal thereto as in FIGS. 2, 3 or 5. It is to be noted that in the FIG. 6b arrangement the basic characteristics of the invention as previously described are preserved, in that the magnetic circuit elements are all made of thin-gauge magnetic strip material and are so disposed that the magnetic flux lines across the airgaps are substantially normal to the flux lines in the magnetic core material. Clearly one advantage of the arrangement just described in connection with FIG. 6b lies in that the energizing windings 23a and 23b can be separately preformed and inserted around the flat core portions 21a and 21b.

It will be evident that the embodiment shown in FIG. 3 may if desired also be similarly modified in the general manner just described so as to permit of direct insertion of preformed windings, even though this would be rendered more difficult due to the arcuate configuration of the core members 11a and 11b.

In a further desirable modification of the invention, shown in FIG. 7, the stationary core structure is in the form of a flat ring 24 having a number of, e.g. four angularly equispaced, radially-inwardly directed flat polar extensions 24a, b, c and d. The rotatable armature member likewise is a flat ring 25 with four radially-outward polar extensions 25a, b, c and d in angularly equispaced relation. The rings 24 and 25 are disposed coaxially in respective parallel planes axially displaced from each other in a manner similar to FIG. 6b so as to provide airgaps parallel to the oscillating axis of the balance wheel to which armature ring 25 is secured. If desired, however, the polar extensions such as 24a and 25a of the stationary and rotatable core members may be bent in the manner shown in FIG. 6a, in which case the core members 24 and 25 could be positioned in a common plane.

In the embodiments of the invention described with reference to FIGS. 3, 5 and 7, the over-all radial dimensions of the system are increased due to the provision of the stationary core structure in substantially the same plane as and in surrounding relation with the balance wheel.

These difficulties can be obviated by using the layout shown in FIG. 8. Here the stationary core structure comprises a flat ring 31 having a number of, e.g. four, angularly equispaced polar legs 31a–31d upstanding perpendicularly to the plane of the ring, and formed by bending radial extensions stamped integrally with the ring 31. The balance wheel 30 is mounted for rotation coaxially with core ring 31 and in a plane parallel with and spaced above the plane of said ring. Carried on the surface of wheel 30 are a pair of parallel flat armature strips 32a and 32b having flanged ends 32c—32d and 32e—32f respectively, providing polar areas cooperating with the ends of the upstanding core legs 31a through 31d to define airgaps normal to the oscillating axis. It will be noted that in this construction the length of the energizing windings 33a through 33d provided on the polar legs of the core can be increased without increasing the radial size of the assembly, an important advantage in many cases. For reasons of economy, however, the four energizing windings shown may be replaced by two windings provided on opposite legs of the core, such as 31a and 31c.

A further advantage of the construction in FIG. 8 is that it makes available a substantial inner space around the oscillating axis of the balance wheel. This space can be used for accommodating clockwork mechanism.

In this as in other embodiments of the invention, the rate of change of reluctance of the magnetic circuit with angular displacement of the balance wheel is extremely high, a feature that greatly enhances the efficiency of the electric motor systems of the invention. Thus, assuming a geometry such that the interaxial angular spacing between the polar flanges of the core structure is 90°, as in the embodiments of FIG. 7 or FIG. 8, the balance wheel displacement required to move from the neutral or maximum-reluctance position to the minimum-reluctance position is 45°. In such conditions the angular extent of the motor period or driving elongation may be selected equal to about 40° as previously explained. Experience has shown that in these circumstances swinging amplitudes of the balance wheel as great as about 270° can easily be accomplished, and this is a remarkable achievement in instruments of the contemplated class, as will be immediately apparent to workers in the field. Indeed, the above represents a ratio of drive period to oscillation amplitude in each direction of only 0.148. The high rate of variation of reluctance with displacement, to which this advantageous feature is ascribable, is due primarily to the fact that the magnetic circuit members of the invention are provided in the form of thin strips, so arranged that the magnetic force lines in the airgaps extending at right angles to the magnetic force lines in the mass of the strips. As a result of this configuration, the cooperating polar areas are presented to each other in end-to-end relation or edge-on, in the neutral, maximum-reluctance position at which the motor period begins, while at the final minimum-reluctance position of said period the polar areas are in flat face-to-face relationship.

Since the flat polar areas are large with respect to the thickness dimension of the strip-like core members, the total volume and mass of iron (or other magnetic material) required for developing a given torque remains low, so that inductance is minimized. This in turn diminishes the sparking effects occurring at the circuitbreaking contacts (such as 17—18, FIG. 3) each time the energizing circuit for the windings is cut off during the oscillation.

Moreover, due to the small total amount of magnetic material required, it becomes economically feasible to use expensive high-permeability materials in the construction of the motor, such as Mu-Metal, Permalloy and the like, without unduly increasing the cost of the motor.

In accordance with a further modification of the invention, especially applicable to those cases where the stationary core structure comprises as in FIG. 7 or FIG. 8 a single continuous annular member 31 providing a common return path for all of the polar flux without any air-gap therein, means such as an additional winding 34 wound around the annular core member e.g. 31 (FIG. 8) for causing the core material to become saturated as soon as the energizing voltage attains a predetermined value. To facilitate the mounting of the saturating winding the core ring may be made in two portions which are assembled, e.g. welded or riveted, into magnetically continuous relationship after the preformed saturating winding sections have been inserted thereon. With the provision of such saturating windings on the core, the magnetic permeability $\mu = B/H$ (where B is flux and H the magnetizing field) will approach unity for a predetermined value of magnetizing current and a further increase in current will produce no further increase in electromotive force and drive torque, thereby resulting in a desirable self-regulating action.

The invention further contemplates providing means for minimizing the effects of temperature variations on the cycle period of the oscillatory motor. In this connection it should be understood that the primary effects of temperature on the cycle period due to expansion and contraction of the metallic balance wheel and hairspring and consequent variations in natural frequency would normally be compensated for by conventional expedients, such as constructing the hairspring from a specially selected alloy wherein dimensional variations due to temperature changes would be substantially compensated for by opposite variations in elasticity modulus, and constructing the balance wheel itself from a dimensionally stable material having a very low expansion factor. However, aside from such primary effects of temperature on oscillating frequency which can be corrected by the expedients just mentioned, a further source of inaccuracy for which temperature is responsible is the fact that the resistance of the energizing windings increases with temperature thereby decreasing the magnetizing current and hence the angular extent or driving elongation of the motor period in each oscillating cycle. In order to eliminate this secondary source of thermal error and attain increased timekeeping accuracy, it is contemplated according to the invention to associate with the core polar extensions one or more elements made from a material having a comparatively low Curie temperature. Such compensating element may take the form of a ring 35 of wire made from a suitable alloy and surrounding the polar extensions such as 31a–31d in FIG. 8 in closely engaging relation with the core material. Materials of the type just specified are known to possess a permeability that decreases with temperature substantially linearly over a certain range. In operation, a small fraction of the useful magnetic flux flowing through the magnetic circuit would be shunted through the ring element, and the proportion of flux thus by-passed will decrease with increasing temperature thus increasing the magnetizing field in the windings and achieving the desired compensation.

According to further desirable features, means are preferably provided for further decreasing any tendency to sparking at the switch contacts as said contacts open at the close of the motor period in each cycle. For this purpose, means may be associated with each polar flange of the core for absorbing and dissipating as heat the residual electro-magnetic energy present in the core material at the instance of cut-off, and such dissipating means may conveniently take the form of closed rings of copper 35 (FIG. 8) or 33f and 33g (FIG. 10) surrounding each of the polar extensions 31a and 31c (FIG. 10) of the core around which an energizing winding 33a and 33c (FIGS. 8 and 9) are provided.

An effective alternative method for suppressing the cut-off spark is to provide a unidirectional conduction element, e.g. a semi-conductor diode 69 (FIG. 10), shunted across the energizing windings and so poled as to block current flow through the element when current is flowing through the windings (FIG. 10a) in the normal sense during a motor period. Such diode will then act to by-pass the reverse current components that tend to flow at the instant the energizing circuit is broken, and suppress sparking.

FIGS. 9 and 10 illustrated by way of example one embodiment of a clock or timekeeper utilizing as prime mover an oscillatory motor of the invention constructed in accordance with FIG. 8. The clock includes a flanged mounting frame 58 upon a base flange portion of which the annular core 31 of the motor is mounted so that the polar flange 31a to 31d project vertically upward therefrom. Energizing windings 33a and 33c are mounted as described above on the diametrically opposed pair of polar flanges 31a and 31c, being connected in an energizing circuit with a D.-C. source and shunted by diode means for the purpose previously explained. The armature strips 32a and 32b secured to the balance wheel 30 are visible in FIG. 10. The balance wheel 30 operates through conventional leverage 40 an escapement wheel 41. Secured on the spindle of the escapement is a worm 42 which meshes with a worm gear 43. A further worm 44 mounted on the shaft of gear 43 meshes with a worm gear 45 which is mounted on a spindle 47 by way of a helical spring 46 which provides a yielding drive connection for said spindle. Secured on an outer end of spindle 47 is a pinion 48 which meshes with a gear 49 integral with a pinion 50. Pinion 50 meshes with a gear 53 upon which an hour-hand, not shown, is mounted by way of bushing 56, while gear 49 meshes with a pinion 54 which carries a minute-hand, not shown, by way of bushing 57. Shaft 47 at its free end is formed with a square driver section 51 for resetting the clock.

It will of course be understood that various modifications other than the ones specifically illustrated and/or described may be introduced into the construction of the reciprocatory electric motor of the invention and that such motor may be usefully applied for other purposes than timekeeping without exceeding the scope of the invention as hereinafter claimed.

What I claim is:

1. In a light magnetic circuit oscillating motor for clock movements and the like, the combination comprising a balance-wheel, a spiral spring attached thereto for oscillating said wheel about a rest position, the improvements comprising means for applying an electromagnetic torque to said balance-wheel during a portion of each half-oscillation thereof, said means including at least two stationary magnetic cores with energizable magnetizing windings thereon and at least two movable armatures secured on the balance-wheel, said magnetic stationary cores and armatures being made of thin-gage magnetic sheet material, and the whole being located in such manner that the magnetic stationary cores are operatively coupled to the balance-wheel and outside thereof and the movable armatures are embedded in the balance-wheel, the magnetic stationary cores being diametrically opposed two by two and the movable armatures being diametrically opposed two by two with respect to the axis of the balance-wheel and the rest position of these members being selected in such manner that the air gap between the polar areas of each magnetic stationary core and the ends of the corresponding armature are maximum.

2. In a light magnetic circuit oscillating motor according to claim 1 further including means for energizing said magnetizing windings when said armatures pass by their rest positions and for deenergizing said windings before these armatures pass by their positions of minimum air gap with respect to said corresponding magnetic stationary cores.

3. In a light magnetic circuit oscillating motor according to claim 1, wherein the magnetic stationary cores and the movable armatures are located in a same plane which is the plane of the balance-wheel.

4. In a light magnetic circuit oscillating motor according to claim 1, wherein the magnetic stationary cores are located in a same plane and the movable armatures are located in another plane parallel to the above mentioned plane.

5. In a light magnetic circuit oscillating motor according to claim 1, wherein said armatures are located in the plane of the balance-wheel, the near ends of two adjacent armatures being combined so that these armatures form a single member having three projecting parts facing the two polar areas of the corresponding magnetic stationary core.

6. In a light magnetic circuit oscillating motor according to claim 1, wherein said magnetic stationary cores are located in a same plane, the near polar areas of a same polarity of two adjacent cores are combined so that these cores form a single member having three polar areas facing the two ends of the corresponding movable armature.

7. In a light magnetic circuit oscillating motor according to claim 1, wherein the magnetic stationary cores and the movable armatures are located in parallel planes, the polar areas of all cores being joined by a magnetic stationary ring so that these cores form a single annular magnetic stationary core provided with a plurality of polar areas and wherein the movable armature is joined by another magnetic ring so that these armatures form a single annular movable armature provided with a plurality of projecting parts.

8. In a light magnetic circuit oscillating motor according to claim 1, wherein the magnetic stationary cores and the movable armatures are located in a same plane, the polar areas of said cores and the ends of said armatures being folded perpendicularly to said plane.

9. In a light magnetic circuit oscillating motor according to claim 1, wherein all the cores are combined in a single magnetic stationary annular core having a plurality of polar areas, said polar areas being folded following a cylindrical surface perpendicular to the plane of said annular core and wherein the ends of the straight line armatures are folded following another cylindrical surface concentric and inside to the first mentioned cylindrical surface.

10. A light magnetic circuit oscillating motor according to claim 9, wherein said magnetic stationary core is formed by a single annular core having a plurality of opposite polar areas, said motor including damping means comprising at least one closed electrically conductive ring surrounding the two opposite polar areas around which an energizing winding is provided, for damping the cut-off sparks.

11. In a light magnetic circuit oscillating motor according to claim 10, wherein said damping means also comprises unidirectional conducting means shunting said winding means in a sense to block normal flow therethrough during energization of the winding means.

12. In a light magnetic circuit oscillating motor according to claim 1, including a single stationary annular core having a plurality of polar areas of high permeability magnetic material having cooperating polar flange portions movable into and out of facing relationship during each swinging cycle of the armatures and a saturation winding means associated with said annular core and energizable for saturating the core material as the energizing voltage applied to said magnetizing windings exceeds a predetermined value.

13. In a light magnetic circuit oscillating motor according to claim 1, wherein said cores are combined in the form of a single annular core having a plurality of polar areas and armatures in the form of strips of high permeability material having cooperating polar flange portions movable into and out of facing relationship during each swing of the armature, and means for compensating the effect of temperature on the swinging frequency comprising means made of a material having a decreasing magnetic permeability when the temperature rises in closely engaging relation said polar flange portions for reducing the magnetic coupling therebetween in said facing position as temperature increases.

References Cited in the file of this patent

UNITED STATES PATENTS 2,895,095    Guyton _____ July 14, 1959